(12) United States Patent
Ranard et al.

(10) Patent No.: US 6,877,657 B2
(45) Date of Patent: Apr. 12, 2005

(54) METHODS AND SYSTEMS FOR PRODUCTION OF TRANSACTION CARDS

(75) Inventors: Timothy S. Ranard, Omaha, NE (US);
James L. Collette, Omaha, NE (US);
Jon F. Rumfield, Omaha, NE (US);
Susan Wheeler, Elkhorn, NE (US);
Timothy P. Kruse, Gretna, NE (US);
Liz Dross, Fort Calhoun, NE (US)

(73) Assignee: First Data Corporation, Englewood, CO (US)

( * ) Notice: Subject to any disclaimer, the term of this patent is extended or adjusted under 35 U.S.C. 154(b) by 0 days.

(21) Appl. No.: 10/609,328

(22) Filed: Jun. 26, 2003

(65) Prior Publication Data

US 2004/0065729 A1 Apr. 8, 2004

Related U.S. Application Data

(60) Provisional application No. 60/392,958, filed on Jun. 28, 2002.

(51) Int. Cl.[7] .................... G06K 5/00; G06F 17/00; G06F 17/60
(52) U.S. Cl. ................ 235/380; 235/375; 235/379; 235/385
(58) Field of Search .................. 235/375, 379, 235/380, 385; 705/28

(56) References Cited

U.S. PATENT DOCUMENTS

| | | | |
|---|---|---|---|
| 4,528,643 A | | 7/1985 | Freeny, Jr. |
| 4,700,055 A | | 10/1987 | Kashkashian, Jr. |
| 4,884,212 A | | 11/1989 | Stutsman |
| 5,012,074 A | * | 4/1991 | Masada ............... 235/379 |
| 5,146,067 A | | 9/1992 | Sloan et al. |
| 5,191,193 A | * | 3/1993 | Le Roux ............... 235/379 |
| 5,220,501 A | | 6/1993 | Lawlor et al. |
| 5,255,182 A | | 10/1993 | Adams |
| 5,352,876 A | | 10/1994 | Watanabe et al. |
| 5,440,108 A | | 8/1995 | Tran et al. |
| 5,471,669 A | | 11/1995 | Lidman |
| 5,477,038 A | | 12/1995 | Levine et al. |
| 5,504,808 A | | 4/1996 | Hamrick, Jr. |
| 5,511,114 A | | 4/1996 | Stimson et al. |
| 5,513,117 A | | 4/1996 | Small |
| 5,557,516 A | | 9/1996 | Hogan |
| 5,592,400 A | | 1/1997 | Sasou et al. |
| 5,637,845 A | | 6/1997 | Kolls |
| 5,678,010 A | | 10/1997 | Pittenger et al. |
| 5,721,768 A | * | 2/1998 | Stimson et al. ......... 379/114.16 |
| 5,796,832 A | | 8/1998 | Kawan |
| 5,868,236 A | | 2/1999 | Rademacher |
| 5,903,633 A | | 5/1999 | Lorsch |
| 5,936,221 A | | 8/1999 | Corder et al. |
| 5,984,181 A | | 11/1999 | Kreft |
| 5,987,438 A | | 11/1999 | Nakano et al. |
| 5,991,748 A | | 11/1999 | Taskett |
| 6,006,988 A | | 12/1999 | Behrmann et al. |
| 6,012,637 A | * | 1/2000 | Hirokawa et al. ......... 235/380 |
| 6,129,275 A | | 10/2000 | Urquhart et al. |

(Continued)

Primary Examiner—Thien M. Le
Assistant Examiner—April Taylor
(74) Attorney, Agent, or Firm—Townsend and Townsend and Crew LLP

(57) ABSTRACT

Methods and systems are provided for producing transaction cards. A reference number is assigned to each of the cards, which are fabricated in accordance with a specification. Usually the specification is provided externally from a card issuer that wishes to have the cards fabricated for distribution. After fabrication, the reference number assigned to each of the cards is compared with a database to identify any duplication. The identity of a responsible operator may be recorded during one or more stages during fabrication and/or as part of the process of comparing with previously assigned numbers.

20 Claims, 11 Drawing Sheets

U.S. PATENT DOCUMENTS

| | | |
|---|---|---|
| 6,169,975 B1 | 1/2001 | White et al. |
| 6,193,155 B1 | 2/2001 | Walker et al. |
| 6,295,522 B1 | 9/2001 | Boesch |
| 6,298,336 B1 | 10/2001 | Davis et al. |
| 6,402,028 B1 * | 6/2002 | Graham et al. ............. 235/380 |
| 6,405,182 B1 | 6/2002 | Cuervo |
| 6,467,687 B1 * | 10/2002 | Hill et al. .................. 235/448 |
| 6,473,500 B1 | 10/2002 | Risafi et al. |
| 6,505,171 B1 * | 1/2003 | Cohen et al. ................ 705/26 |
| 6,510,983 B2 | 1/2003 | Horowitz et al. |
| 6,629,894 B1 * | 10/2003 | Purton ......................... 463/47 |
| 6,719,198 B2 * | 4/2004 | Bretl et al. .................. 235/380 |
| 2001/0016833 A1 * | 8/2001 | Everling et al. .............. 705/39 |
| 2001/0018660 A1 | 8/2001 | Sehr |
| 2001/0023409 A1 | 9/2001 | Keil |
| 2001/0023415 A1 | 9/2001 | Keil |
| 2001/0047342 A1 | 11/2001 | Cuervo |
| 2002/0174016 A1 | 11/2002 | Cuervo |
| 2003/0053609 A1 | 3/2003 | Risafi et al. |

* cited by examiner

```
VLR0010              Version Master Summary              2/01/02 08:37:04
SWHEELER                                                 QPADEV0000

Type options, press Enter.
  2=Change   4=Delete   5=Display   BM=BOM   CA=Case Details   CF=Card Format
  CL=Case Label   DL=Download   LC=Launch   PK=Package Id   RP=RepackagePend
Position to . . .

Pkg                   Machine   Order
opt  orders             version      Split Id  Status          Type     Quantity
     00000000000000000  000000000000000000   1  1                       INKJET    66666666666666
     00000000000000000  000000000000000000   1  1  ERROR                EMBOSS    66666666666666
     00000000000000000  000000000000000000   1  1                       THERMAL   66666666666666
     00000000000000000  000000000000000000   1  1  LAUNCH               INKJET    66666666666666
     00000000000000000  000000000000000000   1  1  LAUNCH               EMBOSS    66666666666666
     00000000000000000  000000000000000000   1  1  LAUNCH               EMBOSS    66666666666666
     00000000000000000  000000000000000000   1  1  REPKGPND             INKJET    66666666666666
     00000000000000000  000000000000000000   1  1  SHIP                 THERMAL   66666666666666
     00000000000000000  000000000000000000   1  1  SHIP                 INKJET    66666666666666
     00000000000000000  000000000000000000   1  1  SHIP                 INKJET    66666666666666
     00000000000000000  000000000000000000   1  1  SHIP                 INKJET    66666666666666
                                                                             More...

F3=Exit   F5=Refresh   F6=Create   F11=Choose View   F12=Cancel   F23=More Options
```

*Fig. 3A*

```
VLR0010   Bill of Material Summary                    2/01/02 08:37:04
SWHEELER Order#/Vrsn/Splt: 00000000000000000  00000000000000000  666    QPADEV0000
                                           ─── 329
Type options, press Enter.
  2=Change    4=Delete    5=Display
                                                                        ─── 325
Position to:
       ─── 322      ─── 323       ─── 324               Item
   Pkg                                                  Cls:  Quantity
Opt Id  Status     Stocks#      Item#          Revision
 __ BB 666 000000000 000000000  00000000000000 66666666  666   6666666666
 __ BB 666 000000000 000000000  00000000000000 66666666  666   6666666666
 __ BB 666 000000000 000000000  00000000000000 66666666  666   6666666666
 __ BB 666 000000000 000000000  00000000000000 66666666  666   6666666666
 __ BB 666 000000000 000000000  00000000000000 66666666  666   6666666666
 __ BB 666 000000000 000000000  00000000000000 66666666  666   6666666666
 __ BB 666 000000000 000000000  00000000000000 66666666  666   6666666666
 __ BB 666 000000000 000000000  00000000000000 66666666  666   6666666666
 __ BB 666 000000000 000000000  00000000000000 66666666  666   6666666666
 __ BB 666 000000000 000000000  00000000000000 66666666  666   6666666666
                                                                  More....

F3=Exit        F5=Refresh       F6=Create        F12=Cancel
```

*Fig. 3B*

| VLR0030 | | Work with Case Details | | 2/01/02 08:37:04 |
| --- | --- | --- | --- | --- |
| SWHEELER Order#/Vrsn/Splt: 000000000000000 00000000000000 666 | | | | QPADEV0000 |

Type options, press Enter.
  5=Display  SD=Sleeve Details  DL=Download

Position to :

| Opt | Pkg Id | Status | Case Number | Cards in Case | Sleeves in Case | Beginning Reference No. | Ending Reference No. |
| --- | --- | --- | --- | --- | --- | --- | --- |
| BB | 666 | 000000000 | 6666666666666666 | 6666666666 | 66666 | 66666666666666666 | 66666666666666666 |
| BB | 666 | 000000000 | 6666666666666666 | 6666666666 | 66666 | 66666666666666666 | 66666666666666666 |
| BB | 666 | 000000000 | 6666666666666666 | 6666666666 | 66666 | 66666666666666666 | 66666666666666666 |
| BB | 666 | 000000000 | 6666666666666666 | 6666666666 | 66666 | 66666666666666666 | 66666666666666666 |
| BB | 666 | 000000000 | 6666666666666666 | 6666666666 | 66666 | 66666666666666666 | 66666666666666666 |
| BB | 666 | 000000000 | 6666666666666666 | 6666666666 | 66666 | 66666666666666666 | 66666666666666666 |
| BB | 666 | 000000000 | 6666666666666666 | 6666666666 | 66666 | 66666666666666666 | 66666666666666666 |
| BB | 666 | 000000000 | 6666666666666666 | 6666666666 | 66666 | 66666666666666666 | 66666666666666666 |
| BB | 666 | 000000000 | 6666666666666666 | 6666666666 | 66666 | 66666666666666666 | 66666666666666666 |
| BB | 666 | 000000000 | 6666666666666666 | 6666666666 | 66666 | 66666666666666666 | 66666666666666666 |

More...

F3=Exit    F5=Refresh    F6=Create    F12=Cancel

*Fig. 3C*

```
VLR0040              Work with Sleeve Details           2/01/02  08:37:04
SWHEELER      Order#/Vrsn/Splt: 000000000000000  0000000000000000  QPADEV0000
           349         Case: 6666666666666
Type options, press Enter.            348
  5=Display   CD=Card Details
Position to :
                                            344
           342          343          Cards in         345              346
          Pkg          Sleeve         Sleeve       Beginning         Ending
Opt   Id  Status       Number                     Reference No.   Reference No.
 BB  666  000000000   6666666666666   6666666666   6666666666666   6666666666666
 BB  666  000000000   6666666666666   6666666666   6666666666666   6666666666666
 BB  666  000000000   6666666666666   6666666666   6666666666666   6666666666666
 BB  666  000000000   6666666666666   6666666666   6666666666666   6666666666666
 BB  666  000000000   6666666666666   6666666666   6666666666666   6666666666666
 BB  666  000000000   6666666666666   6666666666   6666666666666   6666666666666
 BB  666  000000000   6666666666666   6666666666   6666666666666   6666666666666
 BB  666  000000000   6666666666666   6666666666   6666666666666   6666666666666
 BB  666  000000000   6666666666666   6666666666   6666666666666   6666666666666
 BB  666  000000000   6666666666666   6666666666   6666666666666   6666666666666
 BB  666  000000000   6666666666666   6666666666   6666666666666   6666666666666
                                                                    More....
F3=Exit     F5=Refresh     F12=Cancel
```

*Fig. 3D*

```
VLR0050      Work with Card Details                              2/01/02 08:37:04
SWHEELER  Order#/Vrsn/Splt: 000000000000000 000000000000000 666   QPADEV0000
          Case#/Sleeve#: 6666666666666 6666666666666
                                      ╲─ 358
Type options, press Enter.
  5-Display   CD=Card Details
Position to :
           ╲─ 352        ╲─ 353           ╲─ 354
Pkg                                      Card
Opt  Id    Status        Reference No.   Number
     BB  666  000000000   6666666666666   0000000000000000
     BB  666  000000000   6666666666666   0000000000000000
     BB  666  000000000   6666666666666   0000000000000000
     BB  666  000000000   6666666666666   0000000000000000
     BB  666  000000000   6666666666666   0000000000000000
     BB  666  000000000   6666666666666   0000000000000000
     BB  666  000000000   6666666666666   0000000000000000
     BB  666  000000000   6666666666666   0000000000000000
     BB  666  000000000   6666666666666   0000000000000000
     BB  666  000000000   6666666666666   0000000000000000
                                                                      More...

F3=Exit       F5=Refresh             F12=Cancel
```

359 ─╱   (label pointing to "Work with Card Details")
350 ─╱   (label pointing to overall screen)

*Fig. 3E*

METHODS AND SYSTEMS FOR PRODUCTION OF TRANSACTION CARDS

CROSS REFERENCE TO RELATED APPLICATION

This application is a nonprovisional of, and claims the benefit of the filing date of, U.S. Prov. Pat. Appl. No. 60/392,958, filed Jun. 28, 2002, the entire disclosure of which, including the 43-page Appendix entitled "Detailed Design Document: Plog 101840—ValueLink," is incorporated herein by reference for all purposes.

BACKGROUND OF THE INVENTION

This application relates generally to the field of transaction cards. More specifically, this application relates to methods and systems for the production of transaction cards.

There are a variety of different types of transaction cards currently available for use by consumers, including credit cards, debit cards, stored-value cards, and the like. Each of these different types of cards permits consumers to purchase goods and/or services, but on generally different financial bases: credit cards permit purchases to be made in accordance with a credit agreement; debit cards permit purchases to be made through immediate deduction of funds from a remote account; and stored-value cards permit purchases to be made on a prepaid basis. While the value stored on stored-value cards often represents cash value, the concept of value is more general and may include, for example, redeemable points, phone time, and the like.

The ability to use such transaction cards to acquire goods and/or services makes them favored targets for fraud. In some instances, this potential for fraud arises from the very moment the transaction cards are produced. This may be most obvious in the case of stored-value cards since they may be exchanged for goods and/or services as soon as they are produced, but the concern about fraudulent use extends to all types of transaction cards. Accordingly, this application relates to methods and systems for the production of transaction cards that account for these concerns.

BRIEF SUMMARY OF THE INVENTION

Embodiments of the invention provide a method and system for the production of transaction cards that provides improved monitoring capabilities. This is true not only during the production of the transaction cards themselves, but also after production has been completed. First, a unique reference number is assigned to every card that is produced. This number may be different from the card number printed on the card, but may not be repeated for any card, including cards that may be produced on behalf of other card issuers. After production of a card, the number assigned to the card is compared against a database of previously assigned numbers to ensure that there has been no duplication. If there has been duplication, an audit process is available to identify relevant steps in the production of the specific card and the identity of each individual involved in its production. The use of such an audit process may permit improvements in the production system to avoid future duplicate reference-number assignments. The audit process is also useful for other purposes; for example, when a card is missing, the audit process may be used to identify every individual involved in its production and thereby more easily determine the cause of the loss.

Thus, in one embodiment, a method is provided for producing a plurality of transaction cards, which may include stored-value cards among other types of transaction cards. A reference number is assigned to each of the cards, which are fabricated in accordance with a specification. Usually the specification is provided externally from a card issuer that wishes to have the cards fabricated for distribution. After fabrication, the reference number assigned to each of the cards is compared with a database to identify any duplication. The identity of a responsible operator may be recorded during one or more stages during fabrication and/or as part of the process of comparing with previously assigned numbers.

The methods of the present invention may be embodied in a computer-readable storage medium having a computer-readable program embodied therein for directing operation of a system for producing transaction cards. Such a computer system may include a plurality of stations, each having a mechanism for implementing a production function, and an operator interface to permit an operator to monitor the status of the stations. The computer-readable program includes instructions for operating the system to produce transaction cards in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

FIGS. 3A–3E are examples of screens that may be presented to an operator during production of transaction cards in accordance with an embodiment of the invention;

DETAILED DESCRIPTION OF THE INVENTION

Embodiments of the invention provide methods and systems for the production of transaction cards. Such embodiments include a capability for ensuring that every transaction card produced may be identified uniquely and for performing audits of the production process that identify individuals involved with the production of any particular card. There are at least two consequences to this capability. First, including a specific duplication check ensures that any charges associated with the transaction card will be directed to the appropriate person or entity. It is often believed that duplication can be avoided simply by assigning numbers to cards in advance and choosing numbers for assignment that have not been used previously. In practice, this view turns out to be somewhat idealized and failing to account for errors that may occur during the production process. Performing a separate duplication check after production of the transaction cards leads to improved reliability in avoiding duplication. Second, the ability to audit the production of any particular transaction card permits an investigation of the fate of that card. This discourages attempts at theft of cards and increases the possibility of identifying thieves in the event that there is a theft.

Figure 1:
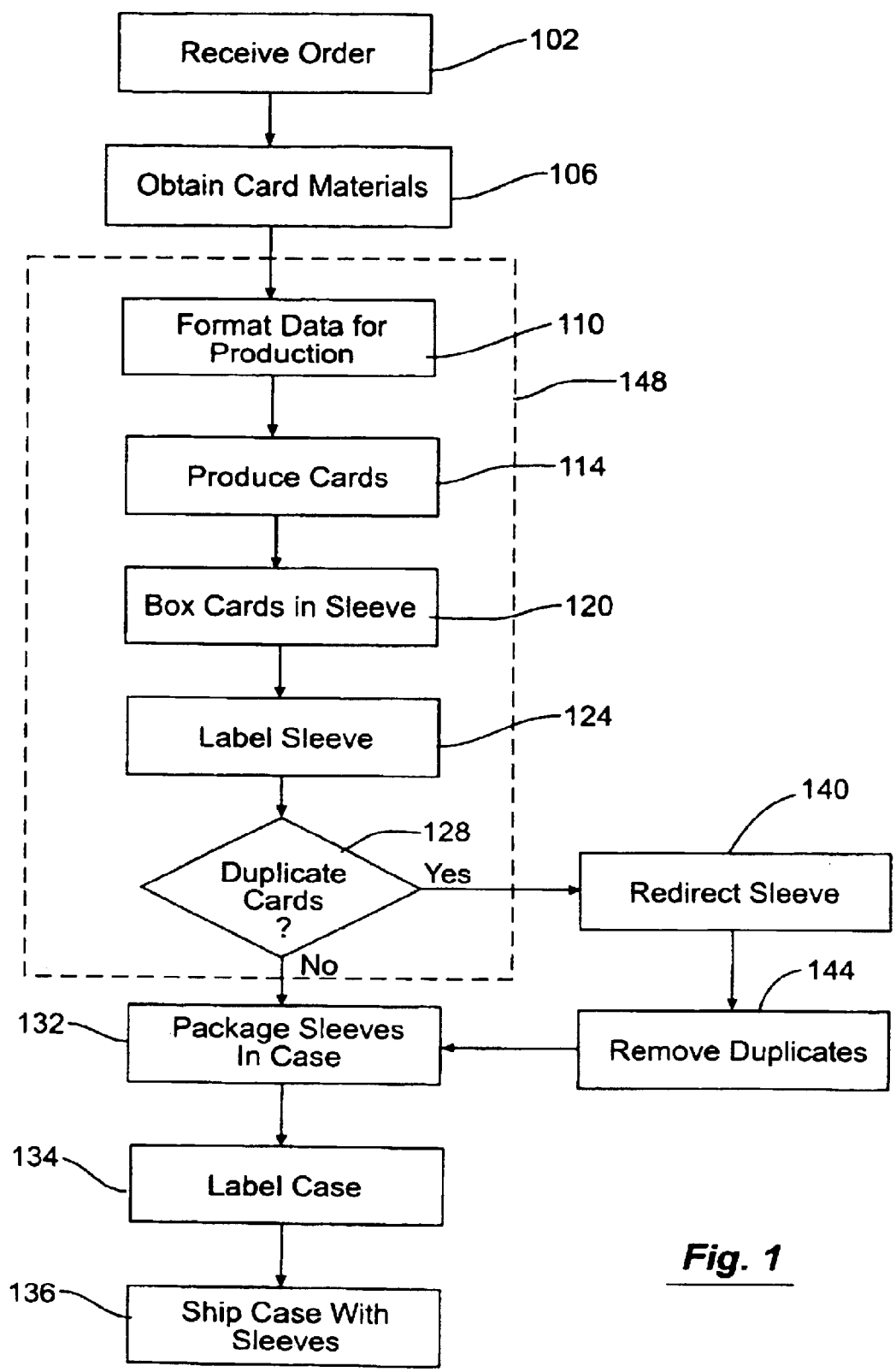
FIG. 1 provides a flow diagram that provides an overview of a transaction-card production process.

A general overview of a method for production of transaction cards is provided in the form of a flow diagram in FIG. 1. The embodiments described below focus on an implementation in which production of transaction cards is performed on behalf of a card issuer, although it is possible in other embodiments for the card issuer to perform the process itself. Generally, such a production process operates as a mass-production process in which a high degree of automation is used to produce a large number of transaction cards. Typically, each card will encounter a plurality of stations during the mass production, with each station performing one part of the overall production process on each card as it passes through the system.

Thus, the process begins at block 102 with an order for transaction cards being received from a card issuer. Generally such an order includes an identification of the type of cards to be produced, their format, their general appearance, and a specification of individual data to be associated with each of the cards. Material to be used in fabrication of the cards is obtained at block 106. Such material may be in the form of prepared cards or may be in the form of plastic that is subsequently processed as part of the method to produce the cards. At block 110, data is formatted to control the operation of the subsequent production, defining the specific operations to be performed in accordance with the description below. Actual production of the cards in accordance with the formatted data is performed at block 114.

As the cards are produced, they are cased in a sleeve at block 120. Generally, a sleeve is capable of holding 100–500 transaction cards. A label is affixed to the sleeve at block 124 to identify the cards in the sleeve. At block 128, a post-production check is performed of the transaction cards in the sleeve to determine whether there has been any duplication of card numbers. This takes the form of comparing the individual numbers assigned to each of the produced cards against a database that includes a history of all card numbers previously produced. In one embodiment, this history may include histories for a plurality of card issuers, permitting a single process to be used in the production of transaction cards for multiple issuers. More specific details of how the comparison at block 128 is performed are set forth below. If no duplicate cards are found at block 128, the sleeve is packaged in a case at block 132; the case may be labeled as indicated at block 134 and shipped to the card issuer at block 136. For shipping, multiple sleeves are packaged within a single case, and multiple cases may be packaged on a single pallet. If cards having numbers that duplicate those of previously issued cards are found at block 128, the sleeve is diverted at block 140 so that the duplicates may be removed at block 144. In some instances, identification of duplicates may be limited to being performed across a subset. For example, in some cases cards may be produced for multiple subclients of a single card issuer and identification of duplicates may be limited to single subclients. After removal of duplicates at block 144, processing on the diverted sleeve then resumes.

Figure 2A:
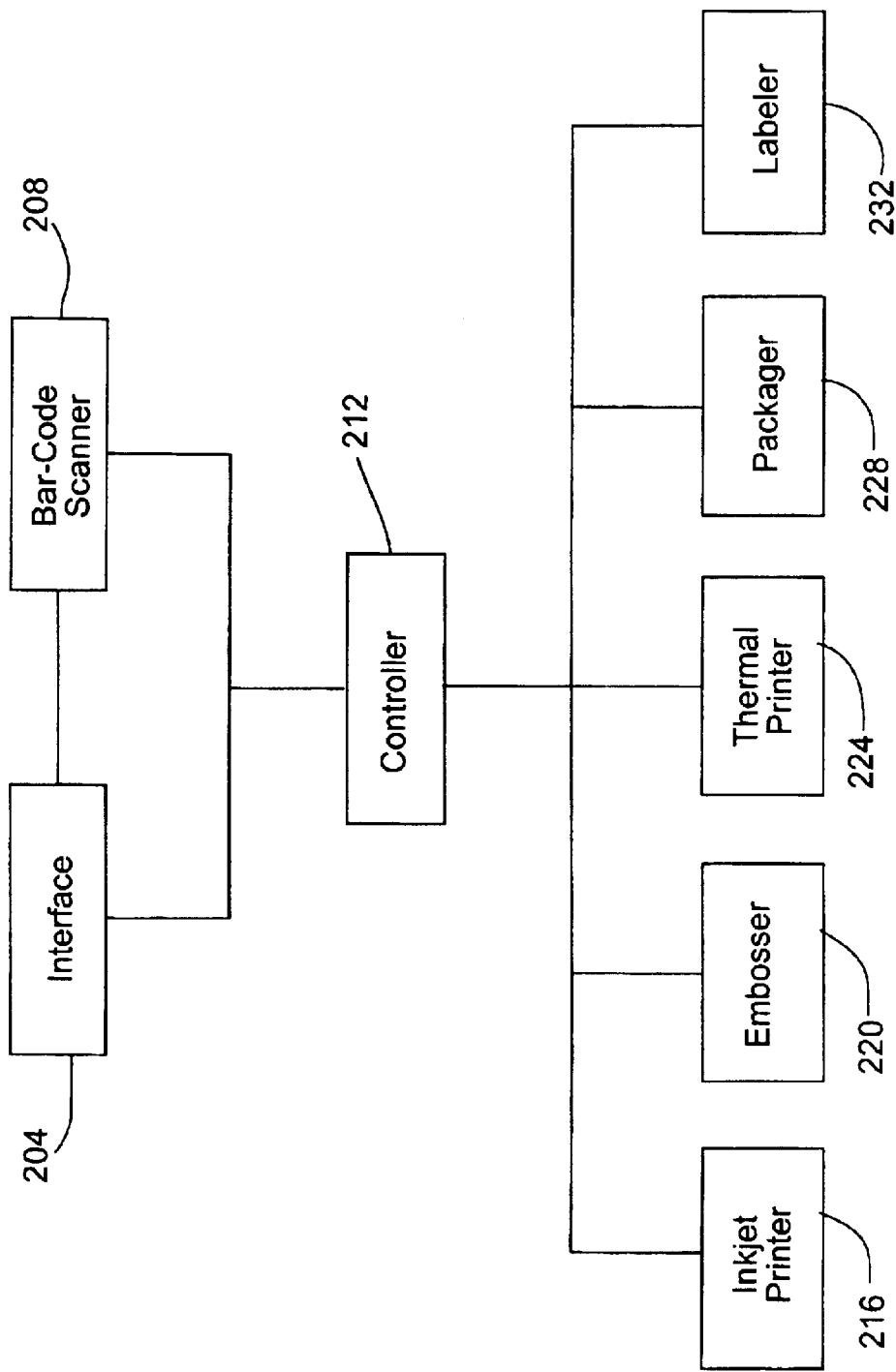
FIG. 2A is a schematic diagram illustrating a configuration for a system used in accordance with an embodiment of the invention for producing transaction cards.

The dashed block 148 in FIG. 1 identifies aspects of the process that correspond to actual production of the transaction cards themselves. These processes may be performed with a structural system such as that shown schematically in FIG. 2A. A controller 212 is used to coordinate aspects of the process and is configured to operate various machines used in the production of the transaction cards. It is not necessary that every one of the machines designated in FIG. 2A be used in the production of any particular card. For example, FIG. 2A shows that three different types of printing machines, namely an inkjet printer 216, an embosser 220, and a thermal printer 224, may be included in the system to accommodate different format specifications from different card issuers. In most instances, only one of these machines is used in the production of a given card, although it is possible in some embodiments for multiple such machines to be used. Other machines that may be used in the process include a packager 228 to insert and wrap the cards in the sleeves and a labeler 232 to print and affix the identification label to the sleeves. Still other machines may be provided to facilitate the mass-production process. Moreover, while FIG. 2A indicates that the machines are separate, there may be some level of integration of the machines so that multiple of the functions are performed by a single machine rather than by multiple machines.

In addition to coordinating the operation of the machines used in the transaction-card production, the controller 212 is in communication with an operator interface 204. This interface provides a mechanism by which the operator may monitor the functioning of the system to initiate the process, modify the process parameters as necessary, and stop the processing when complete. In one embodiment, the operator interface is a screen-based interface in which screens are presented to the operator summarizing the status of processing the transaction cards. The operator may take an active role in the post-production duplication check. Accordingly, a device is provided in communication with the interface 204 and controller 212 to read sleeve information. In FIG. 2A, this device is designated as a bar-code reader 208 since many embodiments of the invention encode information regarding the transaction devices on the sleeves with a bar-code label.

Figure 2B:
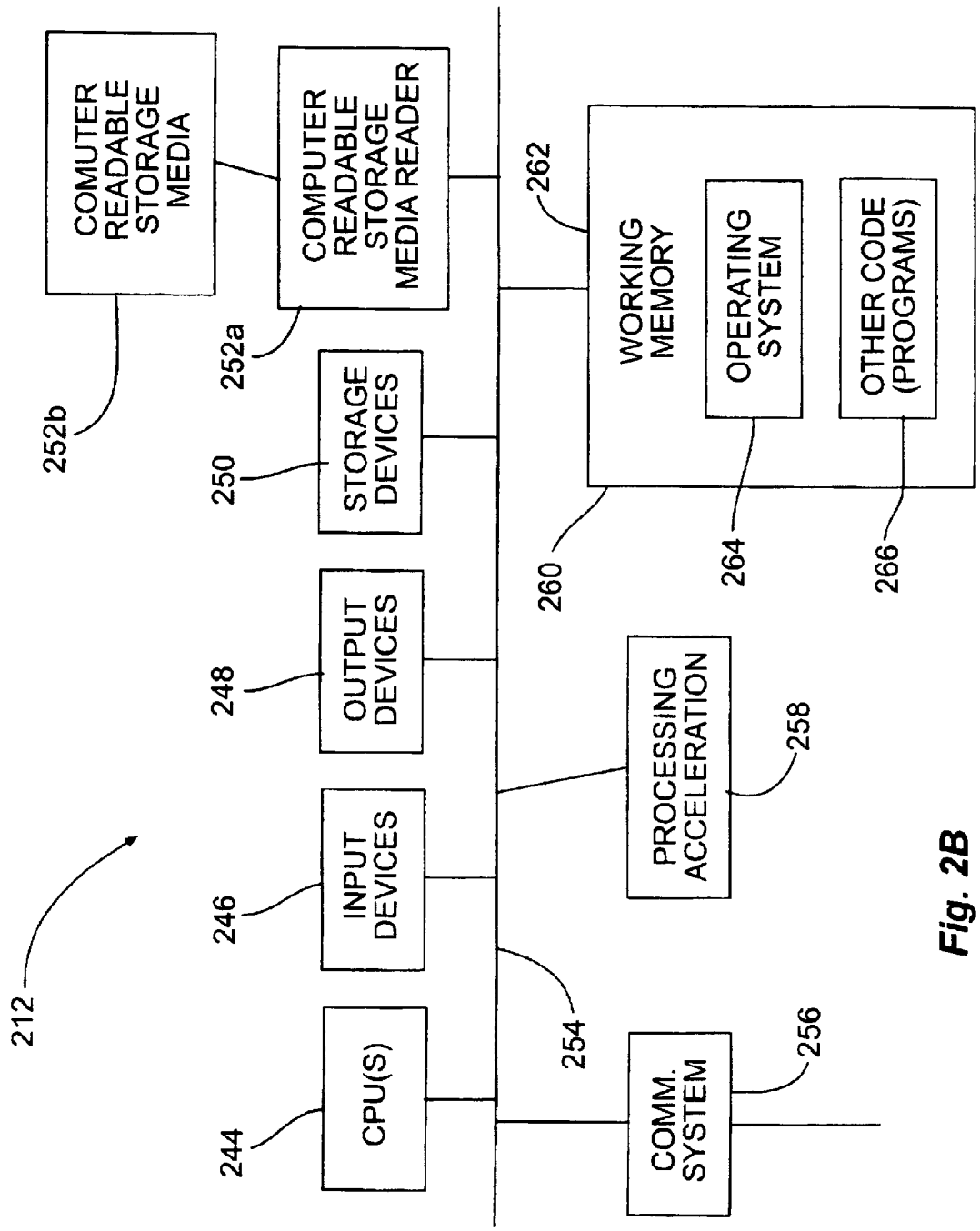
FIG. 2B is a schematic overview of a structure of a computer system on which methods of the invention may be embodied.

A structure for the controller in one embodiment is shown schematically in FIG. 2B. This figure broadly illustrates how individual system elements may be implemented in a separated or more integrated manner. The controller 212 is shown comprised of hardware elements that are electrically coupled via bus 254, including a processor 244, an input device 246, an output device 248, a storage device 250, a computer-readable storage media reader 252a, a communications system 256, a processing acceleration unit 258 such as a DSP or special-purpose processor, and a memory 260. The computer-readable storage media reader 252a is further connected to a computer-readable storage medium 252b, the combination comprehensively representing remote, local, fixed, and/or removable storage devices plus storage media for temporarily and/or more permanently containing computer-readable information. The communications system 256 may comprise a wired, wireless, modem, and/or other type of interfacing connection and permits data to be exchanged with the controller 212, such as with the operator interface 204 or bar-code reader 208.

The controller 100 also comprises software elements, shown as being currently located within working memory 262, including an operating system 264 and other code 266, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

Examples of screens that may be provided to the operator on the operator interface 204 in connection with different aspects of the system are shown in FIGS. 3A–3E. Each of these screens may be generated by the controller 212 with a software module. FIG. 3A is an example of a master summary screen 310 generated by a subprogram that summarizes the status of various orders from card issuers. Some of the summary information is organized in a tabular form, indicating an internal order number 311 that identifies the order from the card issuer. Each order may have one or more subcomponents, designated in FIG. 3A as versions 312 and splits 313. For every order/version/split combination, an indication is provided of the current status 315 of the order/version/split combination. Examples of four such status indications are provided in FIG. 3A, including "ERROR," which indicates a potential problem with implementing the order/version/split combination; "LAUNCH," which indicates that the order/version/split is ready for execution; "REPKGPND," which indicates that repackaging may be needed as a result of a change in the number of cards included in individual sleeves, cases, or pallets; and "SHIP," which indicates that the order/version/split is ready for shipping to the card issuer. In addition, a machine-type designation 315 is also provided for each order/version/split combination to identify the type of cards to be produced, with the designations "INKJET," "EMBOSS," and "THERMAL" corresponding respectively to use of the inkjet-printer 216, the embosser 220, and the thermal printer 224. The size of each order/version/split is indicated in terms of an order quantity 316. Various key functions are defined that permit the operator to modify or delete some of the summary information.

Additional subprograms may be used to review and, if necessary, change data at progressively more detailed levels. Thus, FIG. 3B provides an example of a bill-of-materials screen 320 that summarizes the status of materials to be used in the production of any desired order/version/split combination 329. The bill of materials includes a package identification 321, a stock number 323, and an item number 324 to identify the designated materials. For each such designation, a status 322 is provided as well as an indication of the quantity of material available. Various key functions may be used by the operator to change or delete the bill-of-materials information.

As previously noted, the transaction cards are prepared for shipping by packaging them within sleeves, which are themselves packaged within cases. A subprogram may be used to provide a case-details screen 330 that summarizes the content of each case. In the example shown in FIG. 3C, details of each case are provided for a specified order/version/split combination 339. Each case is identified with a case number 333, for which indications are provided for the status 332 of the case, the number of cards 334 in the case, and the number of sleeves 335 in the case. The individual cards in the case are identified with beginning 336 and ending 337 reference numbers, which are used as unique identifiers of each card and which may differ from the card number printed on the card.

At a lower level of detail, FIG. 3D shows a similar sleeve-details screen 340 that may be generated by another subprogram to summarize the content of each sleeve. Details of each sleeve within a specified case 348 of a specified order/version/split combination 349 are provided. Each sleeve within the case 348 is identified with a sleeve number 343, and information is provided to indicate the status 342 of the sleeve, the number of cards 344 in the sleeve, and beginning 345 and ending 346 reference numbers for the sleeve.

At an even lower level of detail, FIG. 3E shows a card-details screen that may be generated by another subprogram to summarize information on an individual card-by-card basis. Details are provided for each card within a case/sleeve combination 358 of a specified order/version/split combination 349, such details including an indication of the status of the card 352, and correlating the reference number 353 with the card number 354 printed on the card.

Still other subprograms may be provided to allow monitoring and/or control of a variety of other functions. For example, a subprogram may be provided to review and change shipping information for any case. A subprogram may be provided for reviewing and/or changing the format of cards to be produced for a specific order. A subprogram may be provided for reviewing and/or changing the design of a sleeve label for a specific order. A subprogram may be provided for reviewing and/or changing the design of a case label for a specific order. In addition, subprograms may be provided for starting, stopping, restarting, pausing, and otherwise controlling execution of the production process.

Figure 4A:
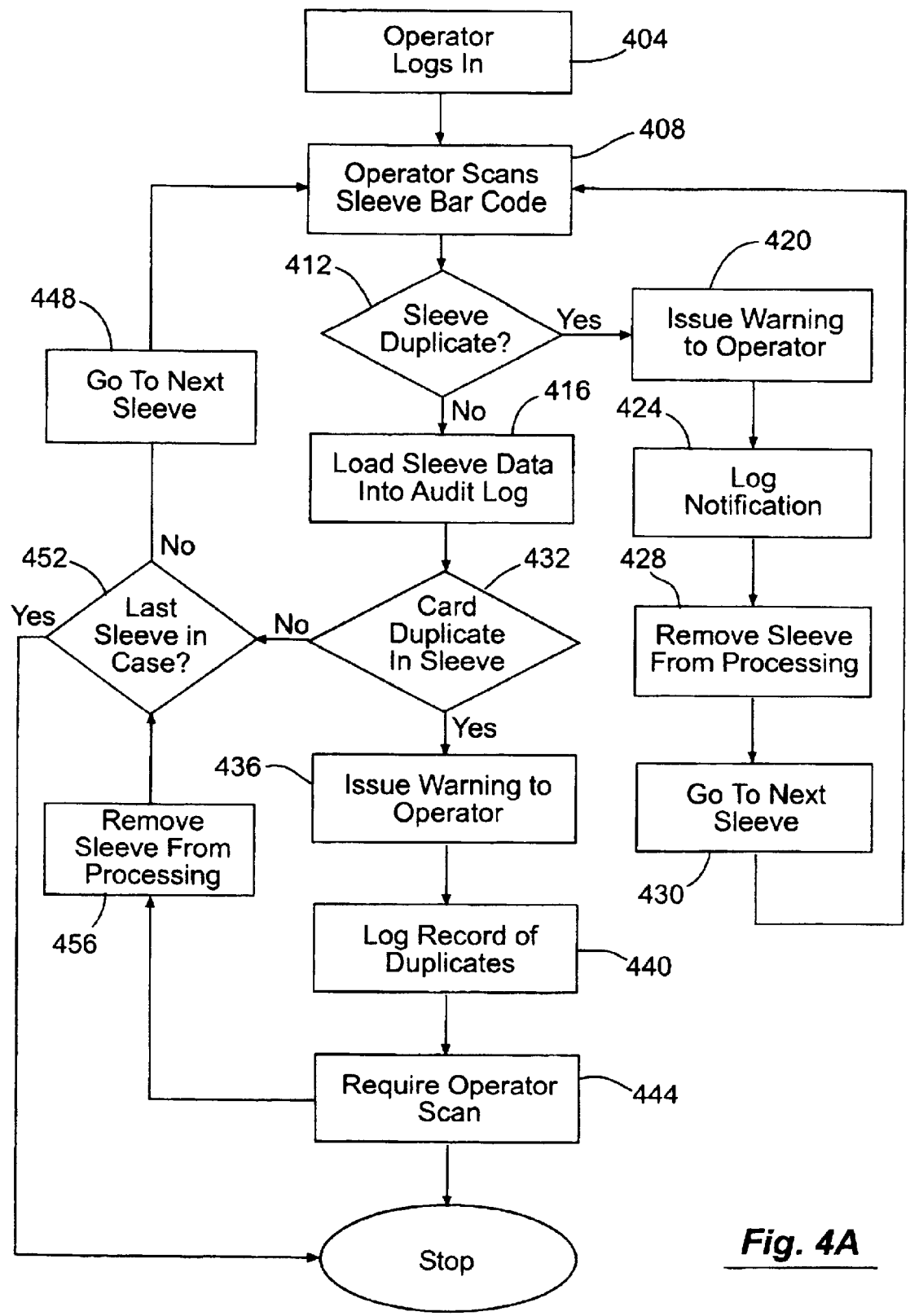
FIG. 4A is a flow diagram illustrating a method for performing a duplication check in accordance with an embodiment of the invention.
Figure 4B:
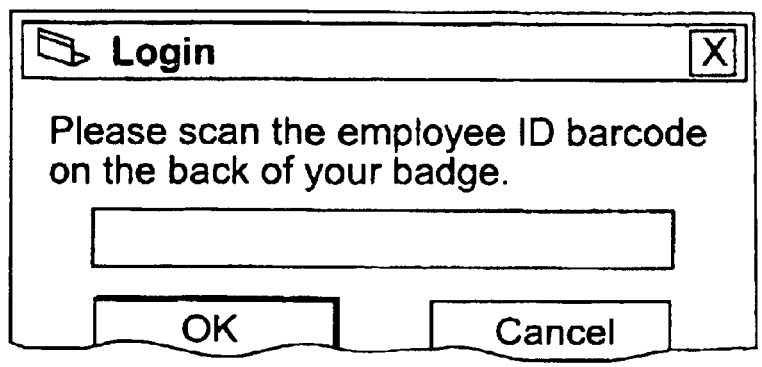
FIGS. 4B and 4C are examples of screen that may be presented to an operator during a duplication check in accordance with an embodiment of the invention.
Figure 4C:
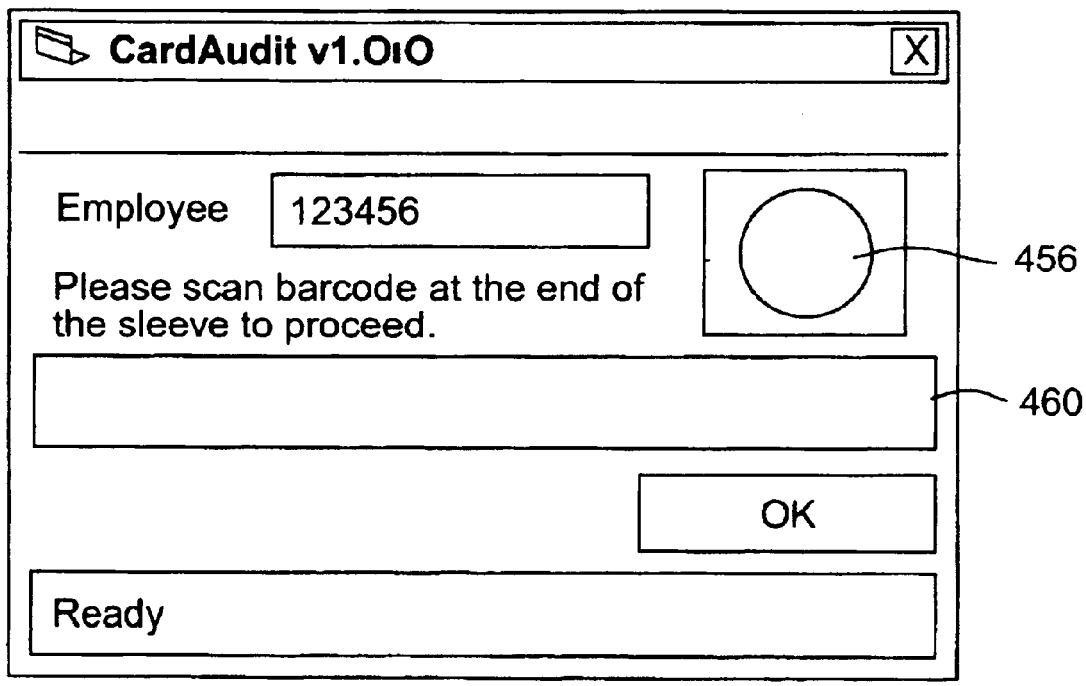

FIG. 4A provides additional details of the procedure for checking for duplicate cards discussed in connection with block 128 of FIG. 1, and the manner in which the operator interacts with subprograms executed by the controller 212 during that process. FIGS. 4B and 4C provide examples of screens that may be presented to the operator through the interface 204 during the duplicate-checking process. Accordingly, the following description sometimes refers simultaneously to FIG. 4A and one of FIGS. 4B and 4C.

At block 404, the operator logs into the system. In one embodiment, this login includes having the operator scan an identification badge, such as with the bar-code reader 208 in communication with the controller 212. An example of a screen used to prompt the operator is provided in FIG. 4B. Tying the login directly to the operator's identification badge is used not only to ensure that the operator is authorized to operate the production system, but also to increase confidence in the identity of the operator for a possible subsequent audit. Logging into the system may also require that the operator enter a password in addition to scanning the identification badge.

After the identity of the operator has been confirmed, the operator scans the bar codes on each of the sleeves of a case to be shipped, permitting the system to progressively check whether one of the sleeves includes a transaction card with a reference number that duplicates that of a previously issued card. Thus, at block 408, the operator scans the bar code of a sleeve, permitting the controller 212 to retrieve information identifying the sleeve and identifying the content of the sleeve. An example of a screen used to prompt the operator to scan the sleeve bar code is shown in FIG. 4C. A status bar 460 may be included on the screen to confirm activity being taken by the controller 212 to the operator. Using the retrieved identification of the sleeve, an initial check is made at block 412 to determine whether the sleeve itself is a duplicate of a previously issued sleeve. If the sleeve is identified as duplicating a previously issued sleeve, a warning is issued to the operator at block 420, perhaps including an audible warning and a visual warning on the screen shown in FIG. 4C. For example, a colored symbol 456 may be used to provide a visual warning, being green before comparing the sleeve information for duplicates, turning yellow during the check, and red if a duplicate is detected. In addition to warning the operator at block 420, a record of the notification is retained on the storage device 250 at block 424. The sleeve is then removed from processing by the operator at block 428 and the operator proceeds to retrieve the next sleeve in the case at block 430 for scanning at block 408.

At block 412, the method proceeds to checking records for the individual transaction cards within the sleeve. At block 416, the data identifying the reference numbers for each of the transaction cards in the sleeve is retrieved and loaded into an audit log, which is then reviewed at block 432 to determine whether any of the reference numbers has previously been used for an issued transaction card. If a duplicate of a previously issued reference number is detected, a warning is issued to the operator at block 436, perhaps including an audible and visual warning. The visual warning may include changing the color of the symbol 456 to red. A record of the duplicate is also retained on the storage device 250 at block 440 for subsequent audit purposes. In addition, a separate individual such as a supervisor or quality-assurance officer may be required to scan his or her identification badge to acknowledge the notification. This additional scanning at the time of the notification ensures that the identification of the duplicate has been reviewed and provides information regarding the identity of the supervisor or quality-assurance officer at a relevant point in the overall processing. The operator may also be instructed to remove the sleeve from the case at block 456 so that the duplicate cards may be removed and an investigation performed as to how the duplicates were allowed to be created.

If no duplicate card is found in the sleeve at block 432, the symbol 456 may return to the color green. For either determination at block 432, the method considers at block 452 whether the last sleeve in the case has been checked. If so, the method stops. If not, the method proceeds to the next sleeve at block 448 and repeats the checking procedure on that sleeve until all sleeves have been checked.

Figure 5:
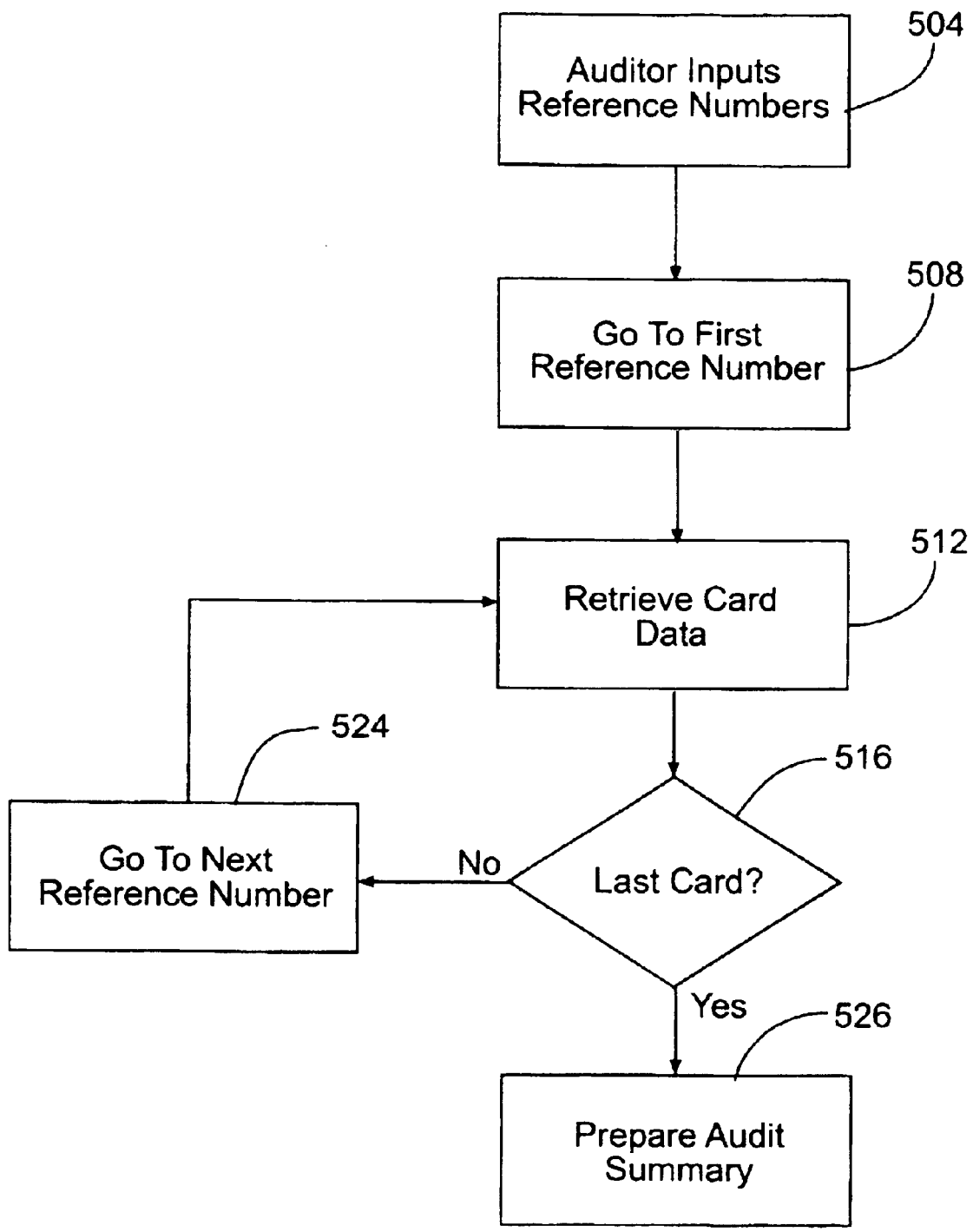
FIG. 5 is a flow diagram illustrating a method for performing an transaction-card audit in accordance with an embodiment of the invention.

The information thus collected during the entire processing, including the duplicate checking described with respect to FIGS. 4A–4C, provides sufficient information to perform an audit when desired. Because the identity of the operator at each stage of the process was recorded, the audit includes an indication specifically of which individuals were responsible for a particular portion of the production at any time. Such an audit may be performed on a card-by-card basis in response to disappearance of a card or other anomalous circumstance, for example. An audit may also be desirable as part of an investigation as to how a duplicate card was created. FIG. 5 provides a flow diagram for an embodiment of how the audit may be performed. At block 504, an auditor inputs the reference numbers for the cards for which the audit is to be performed. At block 508, the system selects the first of these reference numbers so that the corresponding card data may be retrieved from the storage device 250 at block 512. The system loops at blocks 516 and 524, sequentially retrieving data for each of the cards identified by their reference numbers under data have been retrieved for all of the listed cards. This information is then used at block 520 to generate an audit summary. The audit summary will generally list, for each of the requested cards, a series of date and time identifications for several stages in the production process, including an identification of the responsible operator at each of those stages.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for producing a plurality of transaction cards, the method comprising:
    assigning a reference number to each of the transaction cards;
    fabricating the each of the transaction cards in accordance with a specification;
    thereafter, comparing the reference number assigned to the each of the transaction cards with a database of previously assigned reference numbers; and
    rejecting the each of the transaction cards if the reference number duplicates any of the previously assigned reference numbers.

2. The method recited in claim 1 wherein the plurality of transaction cards comprises a stored-value card.

3. The method recited in claim 1 wherein comparing the reference number assigned to each of the transaction cards is performed for a bundle having a predetermined number of transaction cards.

4. The method recited in claim 3 further comprising removing the bundle from a process flow in response to identification that the reference number for at least one of the transaction cards comprised by the bundle is a duplicate of one of the previously assigned reference numbers.

5. The method recited in claim 4 further comprising preventing the bundle from progressing to a subsequent stage in the process flow until a preceding stage in the process flow is completed.

6. The method recited in claim 1 wherein fabricating each of the transaction cards further comprising recording an identity of an operator.

7. The method recited in claim 1 wherein comparing the reference number assigned to each of the transaction cards comprises recording an identity of an operator.

8. The method recited in claim 1 further comprising performing an audit for at least one of the transaction cards to identify a first operator responsible for at least a portion of the fabricating step and a second operator responsible for at least a portion of the comparing step.

9. The method recited in claim 1 wherein the database includes records for previously assigned reference numbers for a plurality of different card issuers.

10. A system for producing transaction cards, the system comprising:
    a plurality of stations, each such station having mechanism for implementing a production function;
    an operator interface to permit an operator to monitor a status of the stations;
    a controller for controlling the stations and the operator interface; and
    a memory coupled to the controller comprising a computer-readable medium having a computer-readable program embodied therein for directing operation of the system, the computer-readable program including:
        instructions for assigning a reference number to each of the transaction cards;
        instructions for fabricating the each of the transaction cards at the plurality of stations in accordance with the production function;

instructions for subsequently comparing the reference number assigned to the each of the transaction cards with a database of previously assigned reference numbers; and instructions for rejecting the each of the transaction cards if the reference number duplicates any of the previously assigned reference numbers.

11. The system recited in claim 10 wherein at least one of the transaction cards comprises a stored-value card.

12. The system recited in claim 10 wherein at least one of the stations includes a device selected from the group consisting of an inkjet printer, an embosser, and a thermal printer.

13. The system recited in claim 10 further comprising an input device for reading an identity of the operator from an identification instrument.

14. The system recited in claim 13 wherein the input device comprises a bar-code reader and the identification instrument includes a bar code that identifies the operator.

15. The system recited in claim 13 wherein the computer-readable program further includes instructions for recording the identity of the operator.

16. The system recited in claim 10 wherein the computer-readable program further includes instructions for performing an audit for at least one of the transaction cards to identify all operators responsible for production of the at least one of the transaction cards.

17. The system recited in claim 10 wherein the database includes records for previously assigned reference numbers for a plurality of different card issuers.

18. A computer-readable storage medium having a computer-readable program embodied therein for directing operation of a system for producing transaction cards including a plurality of stations each having a mechanism for implementing a production function and an operator interface to permit an operator to monitor a status of the stations, the computer-readable program including instructions for operating the system in accordance with the following:

assigning a reference number to each of a plurality of transaction cards;

fabricating the each of the plurality of transaction cards in accordance with a specification;

thereafter, comparing the reference number associated to the each of the plurality of transaction cards with a database of previously assigned reference numbers; and rejecting the each of the transaction cards if the reference number duplicates any of the previously assigned reference numbers.

19. The computer-readable storage medium recited in claim 18 wherein the computer-readable program further includes instructions for recording an identity of the operator.

20. The computer-readable storage medium recited in claim 18 wherein the computer-readable program further includes instructions for performing an audit for at least one of the plurality of transaction cards to identify all operators responsible for production of the at least one the transaction cards.

* * * * *